(12) United States Patent
Nguyen et al.

(10) Patent No.: US 6,999,773 B2
(45) Date of Patent: Feb. 14, 2006

(54) METHOD AND APPARATUS FOR CONTROL CHANNEL SCHEDULING IN A PACKET DATA COMMUNICATION SYSTEM

(75) Inventors: Trang Nguyen, Schaumburg, IL (US); Jyoti N. Black, St. Charles, IL (US); Jeffrey C. Smolinske, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 406 days.

(21) Appl. No.: 10/609,859

(22) Filed: Jun. 30, 2003

(65) Prior Publication Data

US 2004/0266446 A1 Dec. 30, 2004

(51) Int. Cl.
*H04Q 7/20* (2006.01)
*H04Q 7/00* (2006.01)

(52) U.S. Cl. .................. 455/450; 455/455; 370/329; 370/252

(58) Field of Classification Search ............. 455/450, 455/455, 452.1, 452.2, 434, 515, 516; 370/252, 370/329, 335, 341, 442, 330
See application file for complete search history.

(56) References Cited

U.S. PATENT DOCUMENTS

| | | | | |
|---|---|---|---|---|
| 5,774,807 A | * | 6/1998 | Yazaki et al. ............. 455/434 |
| 6,018,661 A | * | 1/2000 | Raith et al. ............... 455/437 |
| 6,118,980 A | | 9/2000 | Dorenbosch et al. | |
| 2001/0046220 A1 | * | 11/2001 | Koo et al. ................. 370/335 |
| 2002/0067736 A1 | * | 6/2002 | Garcia-Luna-Aceves et al. 370/442 |
| 2002/0080719 A1 | * | 6/2002 | Parkvall et al. ............. 370/235 |
| 2002/0145991 A1 | * | 10/2002 | Miya et al. ................ 370/337 |

OTHER PUBLICATIONS

"3$^{rd}$ Generation Partnership Project; Technical Specification Group GSM/EDGE Radio Access Network; Multiplexing and multiple Access on the Radio Path" *3GPPP TS 05.02* v8.10.0; 2001.

* cited by examiner

*Primary Examiner*—Benny Tieu
(74) *Attorney, Agent, or Firm*—Steven A. May

(57) ABSTRACT

A communication system assigns a combination of values of multiple combinations of values to a first control channel parameter and a second control channel parameter. Based on the values assigned to the first and/or second control channel parameters, repeat periods corresponding to each of a first, second, and third control messages are determined. New combinations of values of the multiple combinations of values are then assigned to the first and second control channel parameters and new repeat periods corresponding to each of the first, second, and third control messages are determined in association with each new combination. Optimal repeat periods corresponding to each of the first, second, and third control messages are then selected from among the repeat periods determined with respect to each combination of values. Based on the selected repeat periods, an optimal combination of values is selected for each of the first and second control channel parameters.

18 Claims, 7 Drawing Sheets

METHOD AND APPARATUS FOR CONTROL CHANNEL SCHEDULING IN A PACKET DATA COMMUNICATION SYSTEM

FIELD OF THE INVENTION

The present invention relates generally to packet data communication systems, and, in particular, to channel scheduling in a packet data communication system.

BACKGROUND OF THE INVENTION

The General Packet Radio Service (GPRS) standard provides a compatibility standard for cellular mobile telecommunications systems. The GPRS standard ensures that a mobile station (MS) operating in a GPRS system can obtain communication services when operating in a system manufactured according to the standard. To ensure compatibility, radio system parameters and data transfer procedures are specified by the standard, including protocols governing digital control messages and bearer traffic that are exchanged over an air interface.

In order for a mobile station (MS) to access a GPRS communication system, the MS must first obtain operating information about the system when the MS activates or roams into the system. To facilitate the MS's acquisition of the information, the GPRS standards, in particular 3GPP TS 05.02 (Third Generation Partnership Project Technical Specification 05.02), version 8.10.0, Release 1999, provides for a broadcast, by a Radio Access Network (RAN), of system operating parameters in a Packet Broadcast Control Channel (PBCCH).

Among the types of information that the GPRS standards require that the RAN provide to the MS is Packet System Information (PSI), which information is broadcast in PSI messages. 3GPP TS 05.02 Section 6.3.2.4 requires that the PSI messages be broadcast in specific multiframes and, within each multiframe, within specific blocks of the multiframe allocated to the PBCCH. Typically, there are 12 blocks in a multiframe in a GPRS communication system. The standards further specify three types of PSI messages, that is, a PSI1 message(s), a PSI message(s) that is transmitted with a high repetition rate, and a PSI message(s) that is transmitted with a low repetition rate.

In order to assure that an MS accessing a GPRS system can obtain the requisite PSI messages, the standards further provide for repeated broadcast of the PSI messages. The repeated broadcast is governed by two parameters, a PSI1 repeat period parameter (i.e., PSI1_REPEAT_PERIOD) and a parameter indicating a number of blocks per multiframe allocated to the PBCCH (i.e., BS_PBCCH_BLKS).

The PSI1 repeat period parameter (PSI1_REPEAT_PERIOD) corresponds to how often a PSI1 message is repeated, in terms of a number of multiframes. That is, from another perspective, the PSI1 repeat period parameter corresponds to a number of multiframes in a repeat period. For example, a PSI1 repeat period equal to '3' indicates that a PSI1 message is repeated once every three multiframes, or that there are three multiframes in a repeat period.

The PBCCH block parameter (BS_PBCCH_BLKS) corresponds to a number of PBCCH blocks of each multiframe allocated to the PBCCH. For example, a PBCCH block parameter equal to '4' indicates that the four blocks (typically out of 12) of each multiframe in a repeat period are allocated to the PBCCH. If the PSI1 repeat period parameter is set to '3' and the PBCCH block parameter is set to '4,' then twelve (12) blocks in total would be allocated to the PBCCH in each PSI1 repeat period. While the standards provide for the broadcast of the PSI1 repeat period parameter and the PBCCH block parameter, the standards do not disclose how to determine these parameters.

The standards dictate that all PSI1 messages and high repetition rate PSI messages be repeated during each PSI1 repeat period. The low repetition rate PSI messages are then conveyed during a PSI1 repeat period only when extra PBCCH blocks are available. In accordance with the standards, the first one or two blocks allocated to the PBCCH in each repeat period are allocated to the PSI1 message(s). The succeeding PBCCH blocks of the multiframes of the repeat period are then allocated to high repetition rate PSI messages. Any remaining PBCCH blocks of the multiframes of the repeat period that are not consumed by the PSI1 message(s) and the high repetition rate PSI messages are then allocated to the low repetition rate PSI messages. As a result, when an insufficient number of PBCCH blocks are allocated per repeat period to permit a conveyance of all of the PSI1, high repetition rate PSI, and low repetition rate PSI messages, an MS seeking to access a system may have to listen to several PSI1 repeat periods before the MS is able to acquire all of the low repetition rate PSI messages. In the meanwhile, the MS is acquiring redundant PSI1 messages and high repetition rate PSI messages and is being delayed in accessing the communication system.

In order to minimize a likelihood that an MS seeking to access a system may have to listen to several PSI1 repeat periods, it may be desirable to provide a larger PBCCH block parameter (more PBCCH blocks per multiframe) or a longer PSI1 repeat period (more multiframes per repeat period). However, when an MS acquires the PBCCH in the midst of a PSI1 repeat period, the MS must wait until the beginning of the next repeat period, that is, for the next PSI1 message, before the MS may begin acquiring the PSI messages. Thus a longer PSI1 repeat period may result in a longer access time for an MS, that is, a longer wait for an MS seeking to access a network. Furthermore, a longer PSI1 repeat period may result in wasted PBCCH blocks if there are not sufficient low repetition rate PSI messages to fill all remaining PBCCH blocks after the blocks are first allocated to the PSI1 message(s) and the high repetition rate PSI messages. On the other hand, provision of a larger PBCCH block parameter (more PBCCH blocks per multiframe) reduces the number of blocks in a multiframe allocated to non-PBCCH channels and carrying non-PSI data. In addition, provision of a larger PBCCH block parameter may waste multiframe blocks if there are not sufficient low repetition rate PSI messages to fill all remaining PBCCH blocks after the blocks are first allocated to the PSI1 message(s) and the high repetition rate PSI messages.

For example, FIG. 1 is a block diagram of an exemplary PSI1 repeat period 100. As depicted in FIG. 1, PSI1 repeat period 100 comprises three (3) multiframes 102–104, that is, PSI1_REPEAT_PERIOD=3. Each multiframe 102–104 comprises 12 blocks, and four blocks 106 of each multiframe 102–104 are assigned to a PBCCH 108, that is, BS_PBCCH_BLKS=4. The blocks allocated in each multiframe to the PBCCH need not be contiguous, for example, FIG. 1 depicts blocks 1, 4, 7, and 10 of each multiframe allocated to PBCCH 108. As further depicted by FIG. 1, four PSI messages are conveyed over PBCCH 108. The four PSI messages comprise a PSI1 message that must be conveyed twice during the first multiframe 102 of each PSI repeat period 100, a PSI2 message that is a high repetition rate (HR) PSI message and that also must be conveyed during each PSI repeat period 100, and a PSI3 message and a PSI3bis message that are low repetition rate (LR) messages and that are conveyed during a PSI repeat period 100 only when blocks 106 of PBCCH 108 remain available.

The PSI1 message depicted in FIG. 1 has a single instance and is assigned a first block 106 of PBCCH 108, which block corresponds to a first block, that is, block 1, of a first multiframe 102 of the three multiframes 102–104. The PSI1 message is also repeated in another block 106 of PBCCH 108, that is, block 7 of the first multiframe 102 of the three multiframes 102–104. The PSI2 message depicted in FIG. 1 has two instances, that is, PSI2_1 and PSI2_2, that are assigned to two available blocks 106 of PBCCH 108 that are not assigned to the PSI1 message. As depicted in FIG. 1, the two instances of the PSI2 message are assigned to blocks 4 and 10 of multiframe 102. The PSI3 and PSI3bis messages depicted in FIG. 1 have one instance and six (6) instances, respectively, which instances are assigned successive, available blocks 106 in PBCCH 108 after the PBCCH blocks assigned to the instances of the PSI1 and PSI2 messages.

Due to a sub-optimal determination of a duration of PSI repeat period 100 and of a number of blocks 106 per multiframe 102–104 allocated to PBCCH 108, an instance PSI3_1 of LR message PSI3 is assigned to multiple blocks 106 of PBCCH 108 in PSI repeat period 100, that is, to block 1 of a second multiframe 103 and to block 10 of a third multiframe 104. Such redundancy is inefficient as it wastes a data block. However, if fewer blocks 106, for example three (3) blocks, in each multiframe 102–104 are assigned to PBCCH 108, then PSI repeat period would be unable to accommodate all of the instances of the LR PSI messages. In such an event, the instances not included in the depicted PSI repeat period would then be assigned to the first available blocks 106 of PBCCH 108 in the next PSI repeat period after the allocation of PBCCH blocks to the instances of the PSI1 message and the HR PSI messages, that is, the PSI2 message. However, an MS acquiring the PSI messages when then have to wait for two PSI repeat periods in order to obtain the system information conveyed by the PSI messages. Also an allocation of fewer blocks per multiframe to the PBCCH and a longer repeat period can result in a longer wait for an MS acquiring the PSI messages when the MS begins acquiring the PBCCH in the middle of a PSI repeat period, but an allocation of more blocks per multiframe to the PBCCH reduces an amount of non-PSI information that may be conveyed per multiframe.

Therefore, a need exists for a method and an apparatus that optimizes a determination of the PBCCH block and the PSI1 repeat period parameters.

DETAILED DESCRIPTION OF THE INVENTION

Figure 1:
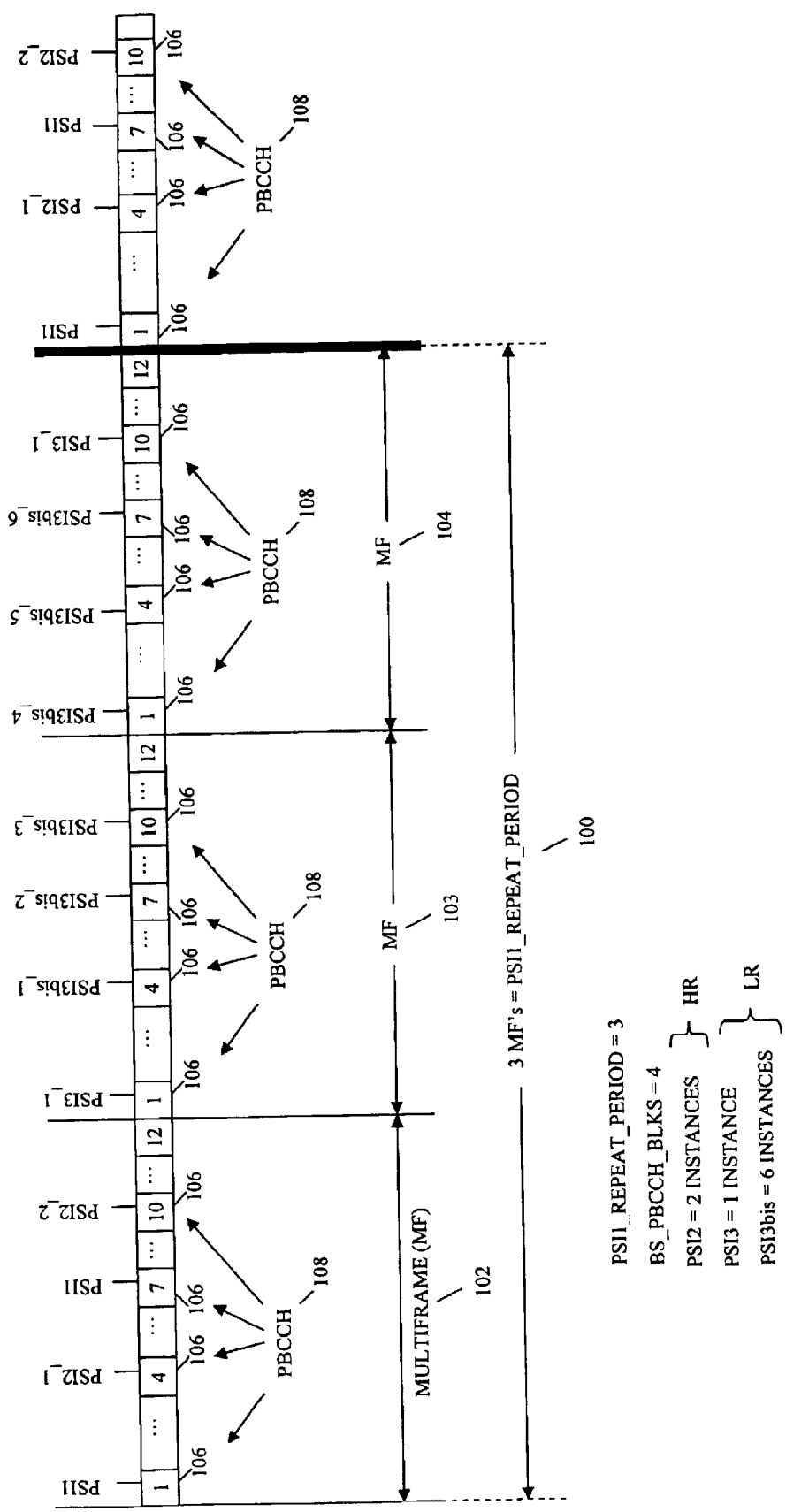
FIG. 1 is a block diagram of an exemplary control channel parameter repeat period of the prior art

To address the need for a method and an apparatus that optimizes a determination of the PBCCH block and the PSI1 repeat period parameters, a communication system assigns a combination of values of multiple combinations of values to a first control channel parameter and a second control channel parameter. Based on the values assigned to the first and/or second control channel parameters, repeat periods corresponding to each of a first, second, and third control messages are determined. New combinations of values of the multiple combinations of values are then assigned to the first and second control channel parameters and new repeat periods corresponding to each of the first, second, and third control messages are determined in association with each new combination. Optimal repeat periods corresponding to each of the first, second, and third control messages are then selected from among the repeat periods determined with respect to each combination of values. Based on the selected repeat periods, an optimal combination of values is selected for each of the first and second control channel parameters.

Generally, an embodiment of the present invention encompasses a method for scheduling a control channel. The method includes: (a) assigning a combination of values of multiple combinations of values to a first control channel parameter and a second control channel parameter, (b) determining a first repeat period associated with a first control message based on the values assigned to each of the first control channel parameter and the second control channel parameter, (c) determining a second repeat period associated with a second control message based on the value assigned to the first control channel parameter, and (d) determining a third repeat period associated with a third control message based on the values assigned to each of the first control channel parameter and the second control channel parameter.

The method further includes (e) determining whether there are any combinations of values of the multiple combinations of values that have not yet been assigned to the first control channel parameter and the second control channel parameter. When there is at least one combination of values of the multiple combinations of values that has not yet been assigned to the first control channel parameter and the second control channel parameter, a not yet assigned combination of values is assigned to the first control channel parameter and the second control channel parameter and steps (b) through (e) are repeated. When steps (b) through (d) have been executed for all combinations of values of the multiple combinations of values, a combination of values of the multiple combinations of values is selected based on at least one of the first repeat period, the second repeat period, and the third repeat period determined in association with each combination of values of the multiple combinations of values.

Another embodiment of the present invention encompasses a controller capable of scheduling a control channel. The controller includes at least one memory device coupled to a processor. The at least one memory device stores multiple combinations of values. The processor assigns a combination of values of the multiple combinations of values to a first control channel parameter and a second control channel parameter, determines a first repeat period associated with a first control message based on the values assigned to each of the first control channel parameter and the second control channel parameter, determines a second repeat period associated with a second control message based on the value assigned to the first control channel parameter, and determines a third repeat period associated with a third control message based on the values assigned to each of the first control channel parameter and the second control channel parameter.

The processor further determines whether there are any combinations of values of the multiple combinations of values that have not yet been assigned to the first control channel parameter and the second control channel parameter. When there is at least one combination of values of the multiple combinations of values that has not yet been assigned to the first control channel parameter and the second control channel parameter, the processor assigns a not yet assigned combination of values to the first control channel parameter and the second control channel parameter and determines a new first repeat period, second repeat period, and third repeat period based on the newly assigned combination of values. When a first repeat period, second repeat period, and third repeat period have been determined for all combinations of values of the multiple combinations of values, the processor selects a combination of values of the multiple combinations of values based on at least one of the first repeat period, the second repeat period, and the third repeat period determined in association with each combination of values of the multiple combinations of values.

Figure 2:
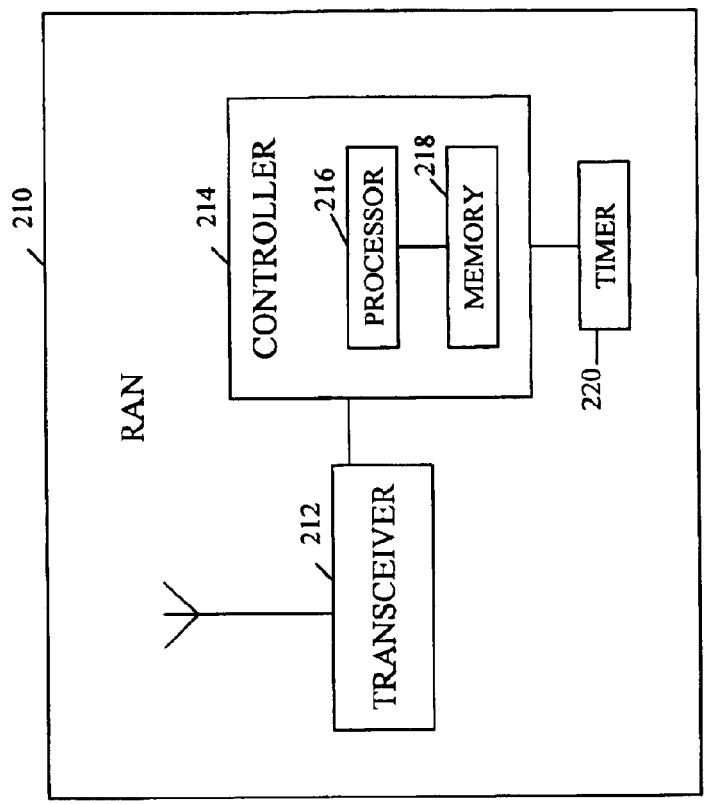
FIG. 2 is a block diagram of a wireless communication system in accordance with an embodiment of the present invention.
Figure 2:
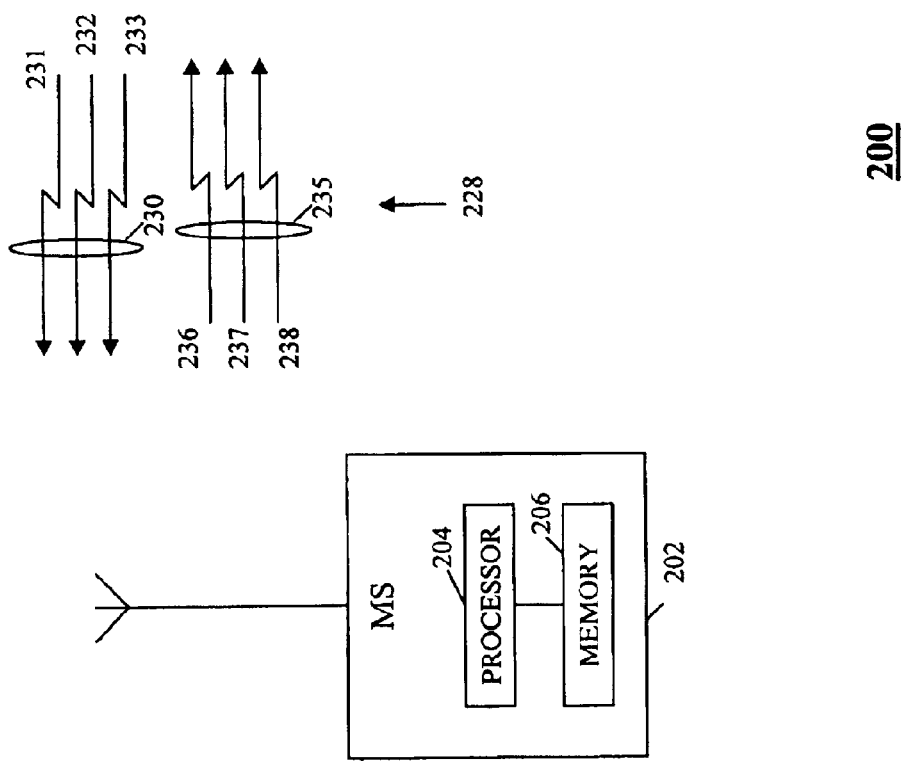

The present invention may be more fully described with reference to FIGS. 2–5C. FIG. 2 is a block diagram of a wireless communication system 200 in accordance with an embodiment of the present invention. Communication system 200 includes at least one mobile station (MS) 202 in wireless communication with a Radio Access Network (RAN) 210. RAN 210 includes at least one transceiver 212 that is operably coupled to a controller 214. As is known in the art, RAN 210 may include elements such as a Base Transceiver Station (BTS), a Base Station Controller (BSC), and a Packet Control Unit (PCU) or a Packet Control Function (PCF). When a RAN, such as RAN 210, includes such elements, controller 214 may be included in any one of such elements or may be distributed among such elements.

RAN 210 provides communications services to mobile stations, such as MS 202, located in a coverage area serviced by the RAN via an air interface 228. Air interface 228 comprises a forward link 230 and a reverse link 235 that each includes multiple communication channels. Preferably, forward link 230 includes a paging channel 231, at least one forward link control channel 232, and at least one forward link traffic channel 233. Preferably, reverse link 235 includes a reverse link access channel 236, at least one reverse link control channel 237, and at least one reverse link traffic channel 238.

Each of MS 202 and controller 214 includes a respective processor 204, 216, such as one or more microprocessors, microcontrollers, digital signal processors (DSPs), combinations thereof or such other devices known to those having ordinary skill in the art. Each of MS 202 and controller 214 further includes a respective at least one memory device 206, 218 associated with the respective processor, such as random access memory (RAM), dynamic random access memory (DRAM), and/or read only memory (ROM) or equivalents thereof, that store data and programs that may be executed by the respective processor and allow the processor to operate in communication system 200.

Preferably, communication system 200 is a General Packet Radio Service (GPRS) communication system that operates in accordance with the 3GPP (Third Generation Partnership Project) standards, which provide a compatibility standard for GPRS air interfaces and which standards are hereby incorporated herein in their entirety. The standards specify wireless telecommunications system operating protocols, including radio system parameters and call processing procedures. In communication system 200, the communication channels of forward link 230 and reverse link 235, such as access channels, control channels, paging channels, and traffic channels, comprise one or more blocks of a multiframe, which multiframes typically comprise 12 blocks and are transmitted in one or more of multiple time slots in a same frequency bandwidth. However, those who are of ordinary skill in the art realize that communication system 200 may operate in accordance with any wireless telecommunication system, such as but not limited to a Global System for Mobile Communications (GSM) communication system, a Time Division Multiple Access (TDMA) communication system, a Frequency Division Multiple Access (FDMA) communication system, a Code Division Multiple Access (CDMA) communication system or an Orthogonal Frequency Division Multiple Access (OFDM) communication system.

When MS 202 activates or roams into communication system 200, the MS must first obtain operating information about the communication system. To facilitate the MS's acquisition of the information, RAN 210 broadcasts system operating parameters via control channel 232 to MSs, such as MS 202, located in the coverage area serviced by the RAN. In particular, in a GPRS communication system such as communication system 200, the 3GPP TS 05.02 (Third Generation Partnership Project Technical Specification 05.02), version 8.10.0, Release 1999, standard provides for a broadcast, by a Radio Access Network (RAN), of system operating parameters in a Packet Broadcast Control Channel (PBCCH), which standard is available from the 3GPP at ETSI, Mobile Competence Centre, 650, route des Lucioles, 06921 Sophia-Antipolis Cedex, France, or on-line at 3gpp.org, and which standard is hereby incorporated by reference herein in its entirety.

The system operating parameters, such as Packet System Information (PSI), are broadcast by RAN 210 via multiple control messages, such as PSI messages. The control messages comprising the system operating parameters may be sub-divided into three types, that is, a first, primary control message, such as a PSI1 message, a second, high repetition rate (HR) control message, such as a PSI message that is transmitted with a high repetition rate, and a third, low repetition rate (LR) control message, such as a PSI message that is transmitted with a low repetition rate. The control messages are broadcast in multiframes over forward link 230 and, within each multiframe, within specific blocks of the multiframe allocated to control channel 232, preferably a PBCCH.

In order to assure that an MS, such as MS 202, accessing communication system 200 can obtain requisite system operating parameters, communication system 200 periodically broadcasts the control messages comprising the system operating parameters via control channel 232. The broadcasts are governed by two control channel parameters, a first control channel parameter corresponding to a repeat period of a first, primary control message and/or of a second, high repetition rate control message, and a second control channel parameter corresponding to a number of blocks per multiframe allocated to control channel 232. For example, a control channel repeat period parameter equal to '3' indicates that first and/or second control messages are repeated once every three multiframes, that is, that there are three multiframes in a control channel repeat period. By way of another example, a control channel block parameter equal to '4' indicates that four blocks of each multiframe (typically consisting of 12 blocks) are allocated to control channel 232. Consequently, a control channel repeat period parameter equal to '3' and a control channel block parameter equal to '4' corresponds to an allocation of 12 blocks to control channel 232 per control channel repeat period.

In a PSI embodiment of the present invention wherein the system operating parameters comprise Packet System Information (PSI) that is broadcast over a PBCCH via PSI messages that include a PSI1 message, a PSI high repetition rate (HR) message, and a PSI low repetition rate (LR) message, the first control channel parameter may be a 'PSI1_REPEAT_PERIOD' parameter that corresponds to a repeat period of the PSI1 message, which parameter is defined in 3GPP TS 05.02 (Third Generation Partnership Project) Technical Specification 05.02), version 8.10.0, Release 1999. In such an embodiment, the second control channel parameter may be a 'BS_PBCCH_BLKS' parameter that corresponds to a number of blocks allocated to the PBCCH, which parameter is also defined in 3GPP TS 05.02, version 8.10.0, Release 1999.

While each of the first and second control messages are repeated in their entirety during each control channel repeat period, the third control messages need not be conveyed in their entirety during each control channel repeat period and are conveyed only when blocks allocated to control channel 232 are available. In communication system 200, in each control channel repeat period, one or more blocks of control channel 232 are first allocated to the first, primary, control message(s). After blocks are allocated to the first control message, remaining available blocks of control channel 232 in the control channel repeat period are next allocated to the second, high repetition rate control, message(s). Any remaining blocks of control channel 232 in the control channel repeat period that are not consumed by the first control message(s) and the second control message(s) are then allocated to the third, low repetition rate control message(s).

Figure 3:
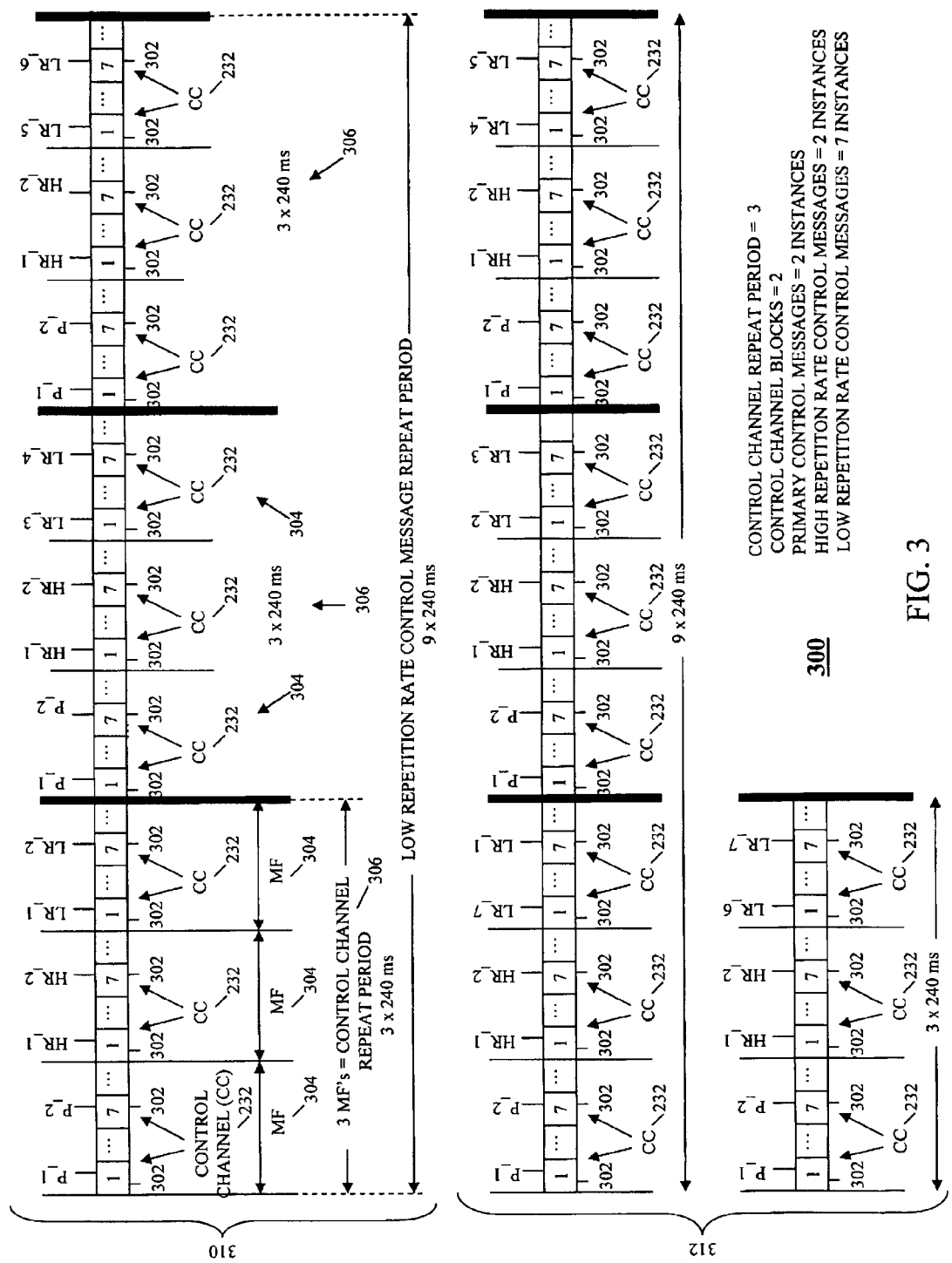
FIG. 3 is a logic flow diagram of a method by which the communication system of FIG. 2 jointly optimizes a control message repeat period and a number of blocks allocated to a control channel in accordance with an embodiment of the present invention.

In order to minimize a waste of control channel blocks while also minimizing a control channel message acquisition time of an MS, such as MS 202, accessing communication system 200, the communication system jointly optimizes a duration of the control channel repeat period and a number of blocks of each multiframe allocated, or assigned, to control channel 232. Referring now to FIGS. 3, 4, 5A, 5B, and 5C, a method is illustrated by which communication system 200 jointly optimizes the control channel repeat period and the number of blocks allocated to control channel 232, and more specifically, the number of blocks in each multiframe allocated to the control channel, in accordance with an embodiment of the present invention. FIG. 3 is a block diagram 300 illustration of an exemplary repeat period of control channel 232, an exemplary number of blocks allocated to the control channel, and an exemplary repeat period of the third, low repetition rate, control messages in accordance with an embodiment of the present invention. FIG. 3 is provided merely to illustrate the principles of the present invention and to assist the reader in understanding the concepts embodied in FIGS. 4, 5A, 5B, and 5C and is not intended to limit the invention in any way.

As depicted in FIG. 3, forward link 230 comprises multiple control channel repeat periods 306. Each control channel repeat period of the multiple control channel repeat periods 306 comprises three multiframes 304. Each multiframe 304 comprises multiple blocks, typically 12 blocks, and, in each multiframe 304, at least two blocks 302 of the multiple blocks are allocated to control channel 232. In FIG. 3, two blocks of each multiframe 304, that is, blocks 1 and 7, are depicted as being allocated to control channel 232. That is, control channel 232 comprises blocks 1 and 7 of each multiframe 304.

Continuing to refer to FIG. 3, depicted therein are two instances of the first, primary control messages, that is, instances P_1 and P_2. In the PSI embodiment of the present invention, each of P_1 and P_2 is an instance of a PSI1 message. The two instances of the first control messages are allocated to two control channel blocks 302 of each control channel repeat period 306. Also depicted in FIG. 3 are two instances of the second, high repetition rate, control messages, that is, instances HR_1 and HR_2. In the PSI embodiment of the present invention, each of HR_1 and HR_2 is an instance of a PSI high repetition rate message. The two instances of the second control messages are allocated to a next two control channel blocks 302 of each control channel repeat period 306, after the control channel blocks are allocated to the instances of the first control messages. Further depicted in FIG. 3 are seven instances of the third, low repetition rate, control messages, that is, instances LR_1 through LR_7. In the PSI embodiment of the present invention, each of LR_1 through LR_7 is an instance of a PSI low repetition rate message. The seven instances of the third control messages are allocated to any control channel blocks 302 of each control channel repeat period 306 that remain unallocated after the control channel blocks are allocated to the instances of the first and second control messages.

Figure 4:
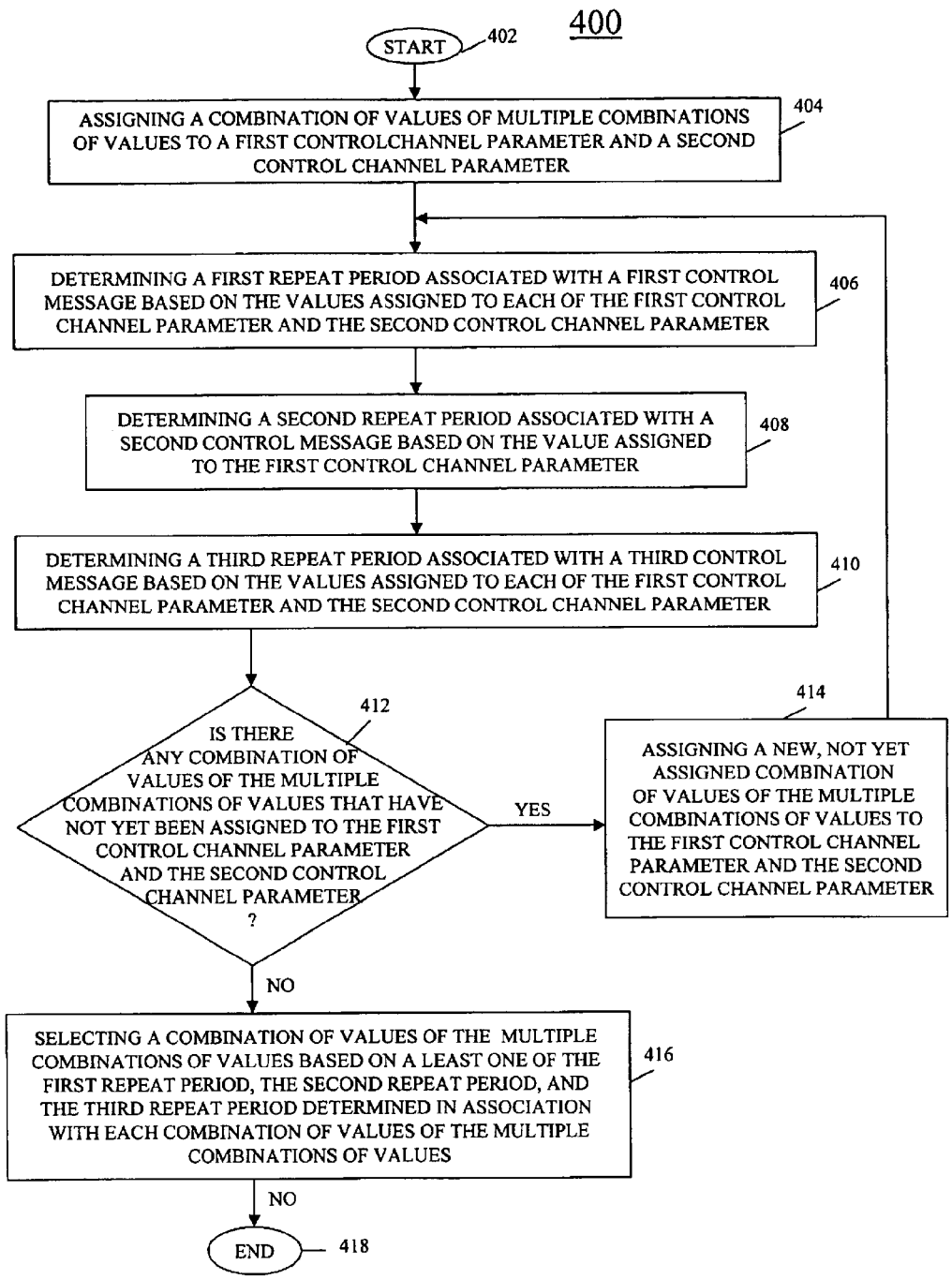
FIG. 4 is a block diagram of an exemplary control channel repeat time period, an exemplary number of blocks allocated to the control channel, and an exemplary low repetition rate message repeat time period in accordance with an embodiment of the present invention.

FIG. 4 is a logic flow diagram 400 of steps executed by communication system 200 to jointly optimize a control channel repeat period and a number of blocks allocated to control channel 232, and more specifically, a number of blocks 302 allocated in each multiframe 304 to the control channel, in accordance with an embodiment of the present invention. As depicted by logic flow diagram 400, the method involves assigning a first combination of values to a first control channel parameter and a second control channel parameter. Based on the values assigned to at least one of the first and second control channel parameters, repeat periods corresponding to each of the first, second, and third control messages are determined. New combinations of values may then be assigned to the first and second control channel parameters and repeat periods corresponding to each of the first, second, and third control messages are re-determined based on each newly assigned combination of values. Optimal repeat periods corresponding to each of the first, second, and third control messages are then selected from among the determined repeat periods and, based on the selected repeat periods, an optimal combination of values may be selected for the first and second control channel parameters.

Logic flow diagram 400 begins (402) when controller 214 assigns (404) a combination of values of multiple combinations of values, such as a combination (3,2), to a first control channel parameter and a second control channel parameter. In particular, controller 214 assigns a first value of the first combination of values, that is, '3,' to the first control channel parameter and a second value of the first combination of values, that is, '2,' to the second control channel parameter. The multiple combinations of values are maintained in the at least one memory device 218.

The first control channel parameter corresponds to a repeat period of control channel 232, that is, to control channel repeat period 306. For example, as depicted in FIG. 3, the first value is a '3,' which value corresponds to a number of multiframes allocated to a repeat period of instances of the first, primary control message(s), that is, P_1 and P_2, and/or the second, high repetition rate (HR) control messages, that is, HR_1 and HR_2. In the PSI embodiment of the present invention wherein the first control messages may be PSI1 messages and the second control messages may be PSI high repetition rate messages, the first control channel parameter may be represented by the parameter 'PSI1_REPEAT_PERIOD,' which parameter corresponds to a repeat period of the PSI1 messages.

The second control channel parameter corresponds to a number of blocks 302 allocated to control channel 232. Preferably, the number of blocks 302 allocated to the control channel 306 corresponds to a number of blocks 302 in each multiframe 304 that allocated to control channel 306. For example, in FIG. 3 the second value is a '2,' that is, two blocks 302 in each multiframe 304 are allocated to control channel 232. As a result, in this iteration of the repeat period determinations, as two blocks 302 in each multiframe 304 are allocated to control channel 232 and three multiframes are allocated to each control channel repeat period 306, the total number of control channel blocks 302 allocated to each control channel repeat period 306 is six (6). Again, in the PSI embodiment of the present invention wherein control channel 232 is a PBCCH, the second control channel parameter may be represented by the parameter 'BS_PBCCH_BLKS,' which parameter corresponds to a number of blocks in each multiframe allocated to the PBCCH.

Based on the values assigned to each of the first and second control channel parameters and further based on a length, that is, a time duration, of a multiframe, typically 240 milliseconds (ms), controller 214 determines (406) a First Repeat Period corresponding to a repeat period of the primary control message(s). Preferably controller 214 determines the first time period in units of milliseconds (ms) as follows, First Repeat Period=control channel repeat period*240-(min(2, number of control channel blocks per multiframe)-1)*120.

where '240' is the length of a multiframe (in milliseconds) and the value '2' corresponds to a maximum number of instances of the first control message. With reference to FIG. 3, the First Repeat Period may be computed as follows First Repeat Period=3(multiframes/control channel repeat period)*240(ms/multiframe)-(min(2, 2(control channel blocks/multiframe))-1)*120 ms=600 ms.

In the PSI embodiment of the present invention wherein the first control message may be a PSI1 message, the first repeat period may be represented by the parameter PSI1_TIME and may be determined in units of milliseconds (ms) as follows, PSI1_TIME=PSI1_REPEAT_PERIOD*240-(min(2, BS_PB-CCH_BLKS)-1)*120.

Controller 214 also determines (408) a Second Repeat Period corresponding to a repeat period of the second, high repetition rate (HR) control message(s) based on the value assigned to the first control channel parameter and further based on the length of a multiframe. Since the second control messages are repeated in their entirety every control channel repeat period 306, the second time period may be determined by multiplying the first control channel parameter, that is, the number of multiframes 304 in a control channel repeat period 306, by the time duration (preferably in units of milliseconds (ms)) of a multi frame.

Referring to FIG. 3, two (2) instances of second, high repetition rate control messages are depicted therein, that is, HR_1 and HR_2. Since all instances of the second control messages must be repeated during each repeat period of control channel 232, the Second Repeat Period may be determined as follows, Second Repeat Period=first control channel parameter*240 ms.

With respect to FIG. 3, the Second Repeat Period=3*240= 720 ms.

In the PSI embodiment of the present invention wherein the second control message may be a PSI high repetition rate message that is conveyed via a PBCCH, the Second Repeat Period may be represented by the parameter PSI_HR_TIME. For example, the Second Repeat Period may correspond to a repeat period of instances of a PSI2 message. Since all instances of PSI high repetition rate (HR) control messages must be repeated during each repeat period of a PBCCH, the PSI high repetition rate control message repeat period may be determined as follows,

PSI_HR_TIME=PSI1_REPEAT_PERIOD*240.

Controller 214 also determines (410) a Third Repeat Period corresponding to an average repeat period of the third, low repetition rate (LR) control message(s) based on the values assigned to each of the first and second control channel parameters and further based on the length of a multiframe. Preferably, the Third Repeat Period, like each of the First and Second Repeat Periods, is determined in units of milliseconds (ms). In the PSI embodiment of the present invention wherein the third control message may be a PSI low repetition rate (LR) message that is conveyed via a PBCCH, the Third Repeat Period may be represented by the parameter PSI_LR_TIME and may be determined based on the PSI1_REPEAT_PERIOD and the BS_PBCCH_BLKS parameters. For example, the Third Repeat Period may correspond to an average repeat period of instances of one or more of a PSI3 message and a PSI3bis message.

Unlike the instances of the first and second control messages, the instances of the third control messages are not required to be repeated in their entirety during each repeat period 306 of control channel 232. Accordingly, an average repeat period is determined with respect to the third control messages since multiple repeat periods of the third control messages may have to be considered before a cycle of repetition of instances of the third control messages may be deduced. Referring now to FIG. 3, seven (7) instances of the third control messages are depicted therein, which instances are designated LR_1 through LR_7. As is apparent in FIG. 3, when the first control channel parameter is assigned a value of '3' and the second control channel parameter is assigned a value of '2,' there are six (6) blocks 302 allocated to control channel 232 in each control channel repeat period 306. Since instances of the first control messages, that is, P_1 and P_2, consume two of the six blocks 302 and instances of the second control messages, that is, HR_1 and HR_2, consume an additional two blocks, only two blocks 302 of control channel 232 remain available in each control channel repeat period 306 for conveyance of instances of the third control messages, that is, LR_1 through LR_7.

Furthermore, it is also apparent in FIG. 3 that the instances of the third control messages will not always fit neatly into an integer number of control channel repeat periods 306 without multiple repetitions of the instances. That is, as depicted in FIG. 3, there are two control channel blocks 302 available in each control channel repeat period 306 for allocation to instances of the third control messages and there are seven instances of the third control messages. As a result, when the Third Repeat Period consists of three control channel repeat periods 306, only six instances of the third control messages can be accommodated in the repeat period and a result is a remainder of one instance (LR_7) of the third control messages. However, when the Third Repeat Period consists of four control channel repeat periods 306, then eight control channel blocks 302 are available for instances of the third control messages with the result that a block is wasted.

Accordingly, in step 410, communication system 200, that is, controller 214, determines the Third Repeat Period as an average repeat period. Controller 214 determines an integer number of multiples of the control channel repeat period 306 required to neatly, that is, no wasted blocks, and completely fit one or more repetitions of the instances of the third, low repetition rate (LR) control messages while filling all blocks available for allocation to the instances of the third control messages. That is, controller 214 determines an integer number of multiples of the control channel repeat period 306 required to convey one or more repetitions of the instances of the third control messages so that all instances are conveyed a same number of times, there is no remainder of instances of third control messages, and there are no wasted, that is, extra, control channel blocks 302. Controller 214 then determines the Third Repeat Period by dividing the total number of control channel repeat periods 306 required to neatly and completely fit the one or more repetitions of the instances of the third control messages by the number of times that of the instances of the third control messages are repeated. As a result, the Third Repeat Period comprises an average number of control channel repeat periods 306 required to convey a single repetition of the instances of the LR control messages. The average number of control channel repeat periods 306 is then converted to a time period, preferably in milliseconds (ms), based on a length of a multiframe.

For example, referring to FIG. 3 and as noted above, it is apparent that a Third Repeat Period consisting of three (3) control channel repeat periods 306 results in a remainder of one instance (LR_7) of the third control messages, while a Third Repeat Period consisting of four (4) control channel repeat periods 306 results in one extra block 302 for conveyance of instances of the third control messages. However, the instances of the third control messages, that is; LR_1 through LR_7, when twice repeated in their entirety, fit neatly into seven (7) control channel repeat periods 306, that is, there is no remainder of instances of the third control messages and there is no extra control channel block 302. As a result, with respect to FIG. 3, the Third Repeat Period may be computed as an average of the two repeat periods incorporating the seven (7) control channel repeat periods 306, that is, Third Repeat Period=[7(control channel repeat periods)*3(multiframes/control channel repeat period)*240(ms/ multiframe)]/2(complete repetitions of the instances of the third control messages)=(21/2)*240 ms.

Figure 5A:
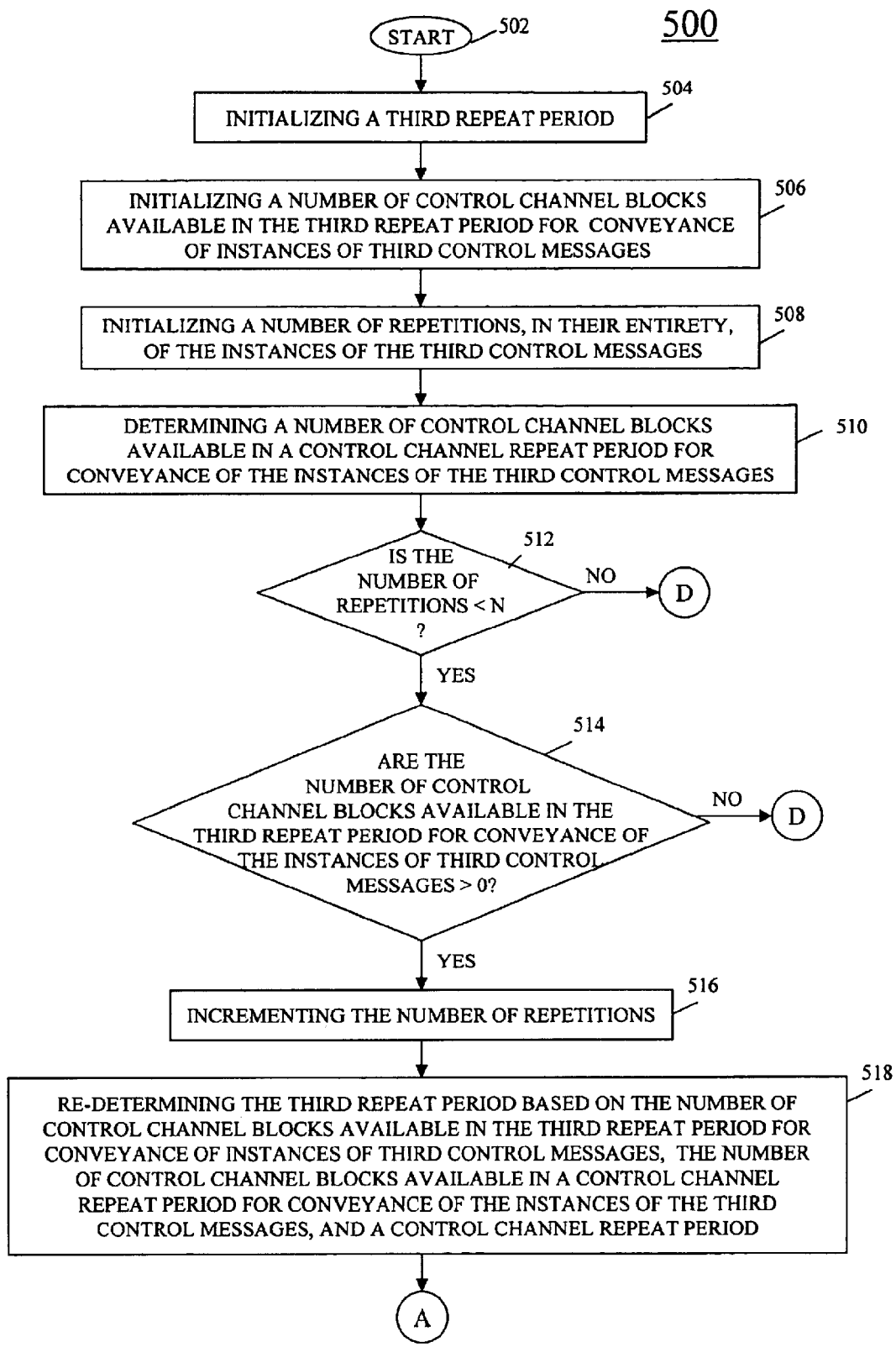
FIG. 5A is a logic flow diagram of steps executed by the communication system of FIG. 2 in determining an average repeat time period for low repetition rate messages in accordance with an embodiment of the present invention.
Figure 5B:
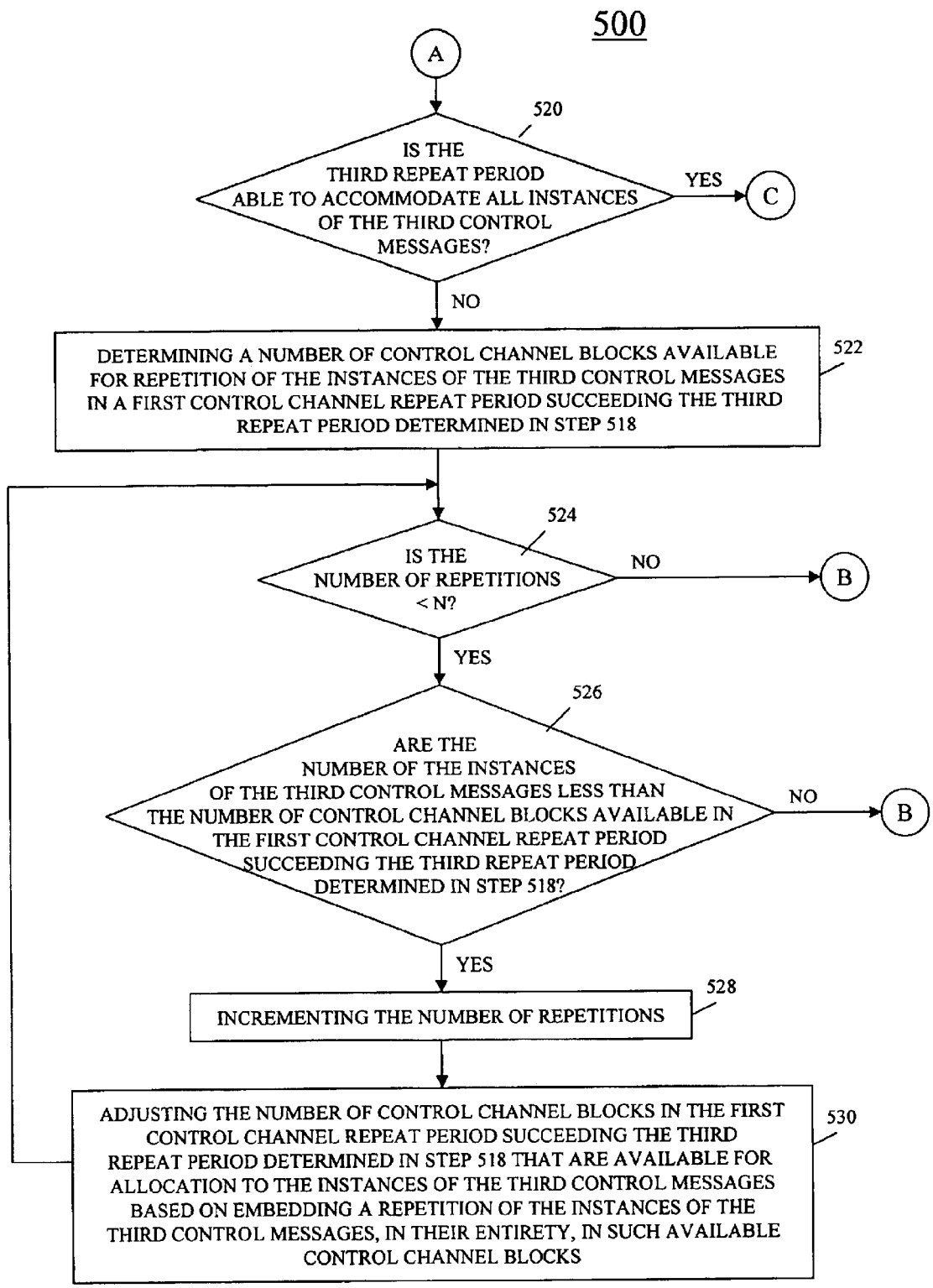
FIG. 5B is continuation of the logic flow diagram of FIG. 5A depicting steps executed by the communication system of FIG. 2 in determining the average repeat time period for low repetition rate messages in accordance with an embodiment of the present invention.
Figure 5C:
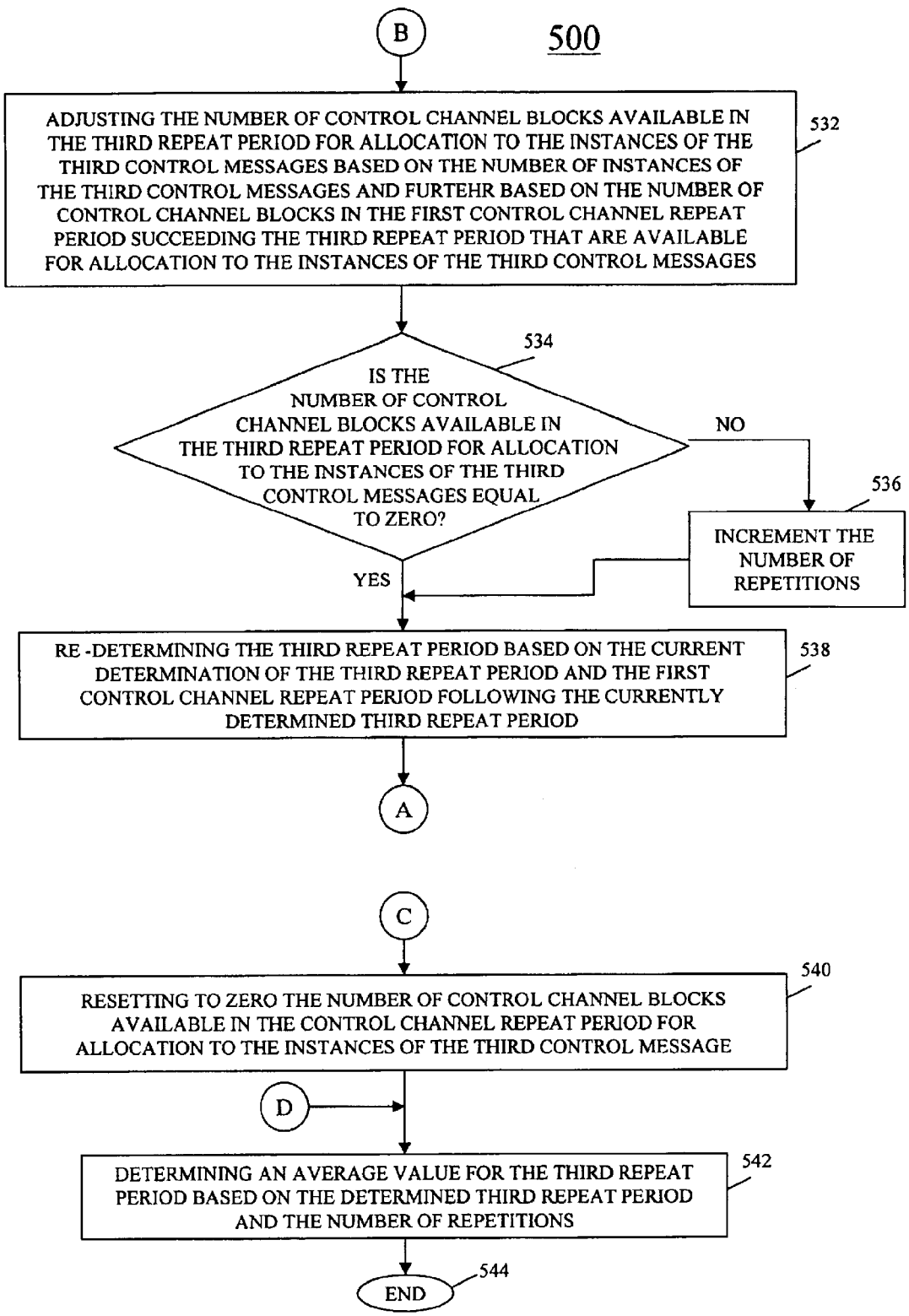
FIG. 5C is continuation of the logic flow diagrams of FIGS. 5A and 5B depicting steps executed by the communication system of FIG. 2 in determining the average repeat time period for low repetition rate messages in accordance with an embodiment of the present invention.

In another embodiment of the present invention, controller 214 may determine the Third Repeat Period in step 410 by performing an iterative process of fitting instances of third, low repetition rate (LR), control messages into available control channel blocks 302. Referring now to FIGS. 5A, 5B, and 5C, a logic flow diagram 500 depicts a method whereby controller 214 iteratively determines the Third Repeat Period in accordance with another embodiment of the present invention. Logic flow diagram 500 begins (502) when controller 214 initializes (504) the Third Repeat Period parameter. Preferably, the Third Repeat Period parameter is initialized with a value equal to zero (0). In the PSI embodiment of the present invention wherein the control messages are PSI messages and the third control messages are PSI low repetition rate control messages, the Third Repeat Period parameter may be represented by the parameter 'PSI_LR_TIME.'

Controller 214 also initializes (506) an LR Blocks Available in the Third Repeat Period parameter corresponding to a number of control channel blocks 302 available in the Third Repeat Period for conveyance of instances of the third control messages, that is, LR_1 through LR_7. Preferably, controller 214 initializes the LR Blocks Available in the Third Repeat Period parameter by setting it equal to a total number of instances of third, low repetition rate control messages. That is, with respect to FIG. 3, the LR Blocks Available in the Third Repeat Period parameter is initialized with the value seven (7). In the PSI embodiment of the present invention wherein the control messages are PSI messages, the LR Blocks Available in the Third Repeat Period parameter may be represented by the parameter 'PSI_COUNT_LR_SCHED,' which value is initialized as follows,

PSI_COUNT_LR_SCHED=PSI_COUNT_LR, where 'PSI_COUNT_LR' corresponds to a total number of instances of the PSI low repetition rate messages.

Controller 214 also initializes (508) an Number of Repetitions of LR Instances parameter. The Number of Repetitions of LR Instances parameter corresponds to a number of repetitions, in their entirety, of the instances of the third, low repetition rate control messages (LR_1 through LR_7) before all the instances fit neatly into an integer number of multiples of the control channel repeat period 306. Preferably, controller 214 initializes the Number of Repetitions of LR Instances parameter as zero (0).

Controller 214 determines (510) a LR Blocks Available In the Control Channel Repeat Period parameter corresponding to a number of blocks available for conveyance of instances of the third, low repetition rate messages in each control channel repeat period 306. The LR Blocks Available In the Control Channel Repeat Period parameter is a function of values assigned to control channel repeat period 306, that is, the number of multiframes 304 per control channel repeat period 306 and the number of blocks 302 per multiframe 304 allocated to control channel 232, and is further a function of the number of instances of the first control message and the number of instances of the second control message.

LR Blocks Available In the Control Channel Repeat Period=(control channel repeat period)*(number of control channel blocks per multiframe)−min(2, number of control channel blocks per multiframe)−(number of instances of the second control message)

where the value '2' corresponds to a maximum number of instances of the first control messages. Referring now to FIG. 3, the LR Blocks Available In the Control Channel Repeat Period parameter may be determined as follows, LR Blocks Available In the Control Channel Repeat Period=3*2−2−2=2.

In the PSI embodiment of the present invention wherein the control messages are PSI messages and the third control messages are PSI low repetition rate messages, the LR Blocks Available In the Control Channel Repeat Period parameter may be represented by the parameter 'PSI_LR_BLKS.' In such an embodiment of the present invention, the PSI_LR_BLKS parameter may be determined based on the following equation, PSI_LR_BLKS=PSI1_REPEAT_PERIOD*BS_PBCCH_BLKS−min(2, BS_PBCCH_BLKS)−PSI_COUNT_HR, where the value '2' corresponds to a maximum number of instances of the PSI1 messages and PSI_COUNT_HR is a parameter corresponding to a number of instances of the PSI high repetition rate control message.

Controller 214 then determines, in steps 512–536, an estimate of the Third Repeat Period, preferably in milliseconds (ms), corresponding to a repetition of the instances of the third control messages, that is, LR_1 through LR_7. Again, in the PSI embodiment of the present invention wherein the control messages are PSI messages and the third control messages are PSI low repetition rate control messages, controller 214 determines, in steps 512–536, an estimate of the parameter 'PSI_LR_TIME.'

Controller 214 executes steps 512–536 in order to determine a number of control channel repeat periods 306 that are required to neatly fit an integer number of multiples of all instances of the third control messages. In order to limit the load imposed on processor 216 by the method disclosed in logic flow diagram 500, controller 214 determines (512) whether a number of iterations of steps 512–536, that is, whether the Number of Repetitions of LR Instances parameter, is less than a predetermined value 'N.' The value 'N' may be any value determined by a designer of communication system 200 and is stored in the at least one memory device 218.

Controller 214 further determines (514) whether the number of blocks 302 of control channel 232 available in the Third Repeat Period for conveyance of instances of the third, low repetition rate control messages, that is, the LR Blocks Available in the Third Repeat Period parameter, is greater than zero (0). When the Number of Repetitions of LR Instances parameter is greater than or equal to 'N' or the LR Blocks Available in the Third Repeat Period parameter is less than or equal to zero (0), logic flow diagram 500 proceeds to step 542. When the Number of Repetitions of LR Instances parameter is less than 'N' and the LR Blocks Available in the Third Repeat Period parameter is greater than zero (0), logic flow diagram 500 proceeds to step 516.

In step 516, controller 214 increments the Number of Repetitions of LR Instances parameter by one (1). For example, when the Number of Repetitions of LR Instances parameter has a value of zero (0), controller 214 now sets the value of the Number of Repetitions of LR Instances parameter at one (1). Controller 214 also re-determines (518) the Third Repeat Period parameter based on the LR Blocks Available in the Third Repeat Period parameter, the LR Blocks Available In the Control Channel Repeat Period parameter, and control channel repeat period 306. Preferably, in step 518, controller 214 re-determines the Third Repeat Period as follows, Third Repeat Period=Third Repeat Period+(LR Control Channel Block/LR Control Channel Repeat Period Blocks)*Control Channel Repeat Period*240.

The Third Repeat Period parameter preferably is determined in units of milliseconds (ms). When the LR Blocks Available in the Third Repeat Period parameter is not evenly divisible by the LR Blocks Available In the Control Channel Repeat Period parameter, then the resulting quotient is rounded down to the nearest integer. That is, with respect to FIG. 3, Third Repeat Period=0+(7/2)*3*240 (ms)=3*3*240=9*240 ms.

Referring now to FIG. 3, the Third Repeat Period determined in step 518 corresponds to a first determination 310 of the Third Repeat Period, which first determination comprises three (3) control channel repeat periods 306.

Controller 214 then determines (520) whether the Third Repeat Period determined in step 518 is able to accommodate, that is, fit, all instances of the third control messages, that is, LR_1 through LR_7. That is, controller 214 determines a Remainder of LR Instances parameter corresponding to a remaining number of instances of the third, low repetition rate control messages that are not accommodated by the Third Repeat Period determined in step 518. Preferably, the Remainder of LR Instances parameter may be determined as follows, Remainder of LR Instances=(LR Blocks Available in the Third Repeat Period) mod(LR Control Channel Repeat Period Blocks)=7%2=1.

For example, with respect to FIG. 3, it is apparent that the first determination 310 of the Third Repeat Period is unable to accommodate one instance of the third control messages, that is, LR_7, and accordingly the Remainder of LR Instances parameter is equal to one (1).

When, in step 520, controller 214 determines that the Third Repeat Period determined in step 518 is able to accommodate all instances of the third control messages, that is, when the Remainder of LR Instances parameter is determined to be equal to zero (0), then logic flow diagram 500 proceeds to step 540. In step 540, controller 214 resets the LR Blocks Available In the Control Channel Repeat Period parameter to a value of zero (0). Controller 214 further determines (542) an average value for the Third Repeat Period based on the determined Third Repeat Period and the number of repetitions of the instances of the third control messages, that is, Third Repeat Period=(Third Repeat Period)/(LR Instance Repetition).

The Third Repeat Period determined in step 542 comprises a Third Repeat Period corresponding to the combination of values assigned to the first control channel parameter and the second control channel parameter in step 404. Logic flow 500 then ends (544).

When, in step 520, controller 214 determines that the Third Repeat Period determined in step 518 is unable to accommodate all instances of the third control messages, that is, when, in step 520 the Remainder of LR Instances parameter is not equal to zero (0), then controller 214 determines (522) a number of control channel blocks 302 available for a repetition of the instances of the third control messages in a first control channel repeat period 306 succeeding the just determined estimate 310 of the Third Repeat Period. That is, controller 310 determines a parameter, LR Blocks Available in a First Control Channel Repeat Period Following the Third Repeat Period, that corresponds to a number of control channel blocks 302 in a first control channel repeat period 306 after the determined estimate 310 of the third repeat period that are available for a repetition of the instances of the third control messages after allocating the control channel blocks 302 of such control channel repeat period 306 to instances of the first and second control messages and to the remaining instances of the third control messages that were not accommodated in the preceding Third Repeat Period 310.

In other words, in step 522, controller 214 determines a parameter LR Blocks Available in a First Control Channel Repeat Period Following the Third Repeat Period, wherein > LR Blocks Available in a First Control Channel Repeat Period Following the Third Repeat Period=LR Blocks Available In the Control Channel Repeat Period−Remainder of LR Instances.

With respect to FIG. 3,

> LR Blocks Available in a First Control Channel Repeat Period Following the Third Repeat Period=2−1=1.

That is, with respect to FIG. 3, in the first control channel repeat period 306 succeeding the just determined estimate 310 of the Third Repeat Period, only one (1) of the two control channel blocks 302 available for instances of the third control messages is available to repeat the instances of the third control messages. The other such block is embedded with the remaining third control message instance, that is, LR_7, not accommodated by the preceding third repeat period 310.

Controller 214 then determines (524) whether the Number of Repetitions of LR Instances parameter is less than 'N.' Controller 214 further determines (526) whether the number of instances of the third control messages is less than the number of control channel blocks 302 available for allocation to the instances of the third control messages in the first control channel repeat period 306 following the Third Repeat Period 310 determined in step 518. That is, controller 214 determines whether, > LR Blocks Available in a First Control Channel Repeat Period Following the Third Repeat Period>number of instances of the third control messages.

When the LR Blocks Available in a First Control Channel Repeat Period Following the Third Repeat Period parameter is greater than the number of instances of the third control messages, then there are more than enough control channel blocks 302 in the first control channel repeat period 306 following the just determined Third Repeat Period 310 to allow for a repetition the instances of the third control messages in their entirety.

As a result, in steps 524 and 526, when the Number of Repetitions of LR Instances parameter is less than 'N' and the LR Blocks Available in a First Control Channel Repeat Period Following the Third Repeat Period parameter is greater than the number of instances of the third control messages, controller 214 increments (528) the Number of Repetitions of LR Instances parameter that is, sets Number of Repetitions of LR Instances=Number of Repetitions of LR Instances+1. Controller 214 also adjusts (530) the number of control channel blocks 302 in the first control channel repeat period 306 following the just determined Third Repeat Period 310 that are available for allocation to instances of the third control messages based on embedding a repetition of the instances of the third control messages, in their entirety (all seven instances LR_1 through LR_7), in such available control channel blocks 302.

That is, in step 530, controller 214 adjusts the parameter LR Blocks Available in a First Control Channel Repeat Period Following the Third Repeat Period as follows, > LR Blocks Available in a First Control Channel Repeat Period Following the Third Repeat Period=(Available LR Blocks Available In the Control Channel Repeat Period in a First Control Channel Repeat Period of a Next Third Repeat Period)−(number of instances of the third control messages).

Upon execution of steps 528 and 530, controller 214 returns to step 524, thereby filling the control channel blocks 302 available for instances of the third control messages in the first control channel repeat period 306 of a next Third Repeat Period 312 with the instances of the third control messages, that is, LR_1 through LR_7.

When, in steps 524 and 526, the Number of Repetitions of LR Instances parameter is greater than or equal to 'N' and/or the the number of instances of the third control messages is greater than or equal to the LR Blocks Available in a First Control Channel Repeat Period Following the Third Repeat Period parameter, logic flow diagram 500 proceeds to step 532. That is, when the maximum number of repetitions of the instances of the third control messages, that is, of iterations of steps 512-538, has been achieved and/or the number instances of the third control messages, that is, LR_1 through LR_7, are greater than or equal to the (adjusted) number of control channel blocks 302 available for to allocation instances of the third control messages in the first control channel repeat period 306 after the determined third repeat period 310, controller 214 then proceeds to step 532.

In step 532, controller 214 adjusts the LR Blocks Available in the Third Repeat Period parameter based on the parameters number of instances of the third control message and the LR Blocks Available in a First Control Channel Repeat Period Following the Third Repeat Period parameter. In particular, controller 214 adjusts the LR Blocks Available in the Third Repeat Period parameter to reflect the number of instances of the third control message that could be included in the first control channel repeat period 306 of the next third repeat period after the just determined Third Repeat Period 310, that is, Third Repeat Period 312. Preferably, controller adjusts the LR Blocks Available in the Third Repeat Period parameter as follows, > LR Blocks Available in the Third Repeat Period parameter=(number of instances of the third control message)−(LR Control Channel Blocks Available in a First Control Channel Repeat Period Following the Third Repeat Period).

Controller 214 then determines (534) if the LR Blocks Available in the Third Repeat Period parameter is equal to zero (0). If the LR Blocks Available in the Third Repeat Period parameter is not equal to zero, logic flow diagram 500 proceeds to step 538. If the LR Blocks Available in the Third Repeat Period parameter is equal to zero, controller 214 increments (536) the Number of Repetitions of LR Instances parameter by one (1) and logic flow diagram 500 then proceeds to step 538.

In step 538, controller 214 re-determines the Third Repeat Period based on the current determination 310 of the Third Repeat Period and the first control channel repeat period 306 after the currently determined Third Repeat Period 310. That is, in step 538, controller 214 re-determines the Third Repeat Period as follows, > Third Repeat Period=(Third Repeat Period)+(first control channel repeat period following the currently determined Third Repeat Period*240).

Logic flow diagram 500 then returns to step 520, where an average Third Repeat Period is determined (542) when one or more repetitions of all instances of the third control message neatly fit into an integer number of multiple control channel repeat periods 306 and otherwise steps 522 through 538 are repeated in order to further determine the Third Repeat Period. As a result, the Third Repeat Period is repeatedly expanded control channel repeat period-by-control channel repeat period until one or more repetitions of all instances of the third control message neatly fit into an integer number of multiple control channel repeat periods 306, at which point an average Third Repeat Period is then determined and logic flow 500 ends (544).

In the PSI embodiment of the present invention wherein the control messages are PSI messages, the first control messages are PSI1 messages, the second control messages are PSI high repetition rate messages, the third control messages are PSI low repetition rate messages, and control channel 232 is a PBCCH, the steps depicted in logic flow diagram 500 may be represented as follows in the Pseudo specification language, yet been assigned to the first control channel parameter and the second control channel parameter, controller 214 assigns (414) a not yet assigned combination of values to the first control channel parameter and the second control channel parameter and repeats steps (406) through (412). When controller 214 determines, in step 412, that there are no remaining combinations of values of the multiple combinations of values that have not yet been assigned to the first control channel parameter and the second control channel parameter, controller 214 selects (416) a combination of values of the multiple combinations of values based on one or more of a First Repeat Period, a Second Repeat Period, and a Third Repeat Period determined in association with each combination of values of the multiple combinations of values. Logic flow 400 then ends (418).

In one embodiment of the present invention, step 416 comprises selecting a combination of values that yielded a most desirable result with respect to an average repeat

```
PSI_LR_TIME = 0
PSI_COUNT_LR_SCHED = PSI_COUNT_LR
ITERATION = 0
PSI_LR_BLKS = PSI1_REPEAT_PERIOD * BS_PBCCH_BLKS - min(2,
        BS_PBCCH_BLKS) - PSI_COUNT_HR
While ((ITERATION < N) and (PSI_COUNT_LR_SCHED > 0))
    ITERATION++
    PSI_LR_TIME += (PSI_COUNT_LR_SCHED div PSI_LR_BLKS) *
            PSI1_REPEAT_PERIOD) * 240
    REM_PSI_COUNT_LR_SCHED = PSI_COUNT_LR_SCHED mod
            PSI_LR_BLKS
    If (REM_PSI_COUNT_LR_SCHED = = 0)
        PSI_COUNT_LR_SCHED = 0 // Get out of while loop
    Else {
        REM_PSI_LR_BLKS = PSI_LR_BLKS -
                REM_PSI_COUNT_LR_SCHED
        While ((ITERATION < N) and (PSI_COUNT_R <
            REM_PSI_LR_BLKS)) {
            ITERATION++
            REM_PSI_LR_BLKS -= PSI_COUNT_LR
        }
        PSI_COUNT_LR_SCHED = PSI_COUNT_LR - REM_PSI_LR_BLKS
        If (PSI_COUNT_LR_SCHED = = 0)
            ITERATION++
        PSI_LR_TIME += PSI1_REPEAT_PERIOD) * 240
    }
}
PSI_LR_TIME = PSI_LR_TIME div ITERATION.
```

In the PSI message embodiment, the parameter 'PSI_COUNT_LR_SCHED' corresponds to the parameter LR Blocks Available in the Third Repeat Period, the 'ITERATION' parameter corresponds to the parameter Number of Repetitions of LR Instances, the parameter 'PSI_COUNT_HR' corresponds to the number of instances of PSI high repetition rate messages, the parameter 'PSI_LR_BLKS' corresponds to the parameter LR Blocks Available In the Control Channel Repeat Period, the parameter 'REM_PSI_COUNT_LR_SCHED' corresponds to the parameter Remainder of LR Instances, and the parameter REM_PSI_LR_BLKS corresponds to the parameter LR Blocks Available in a First Control Channel Repeat Period Following the Third Repeat Period.

Referring back to FIG. 4, after determining a Third Repeat Period in step 410, controller 214 determines (412) whether there are any combinations of values of the multiple combinations of values that have not yet been assigned to the first control channel parameter and the second control channel parameter. When there is at least one combination of values of the multiple combinations of values that has not period, which average repeat period is an average of two or more of the First Repeat Period, the Second Repeat Period, and the Third Repeat Period. For example, controller 214 may determine an Average Repeat Period parameter for each combination of values of the multiple combinations of values based on the following equation, Average Repeat Period=0.5*(First Repeat Period)+max(Second Repeat Period, Third Repeat Period).

However, those who are of ordinary skill in the art realize that there are many ways to determine an Average Repeat Period parameter, such as various methods of determining a weighted average of two or more of the three repeat periods, which may be utilized herein without departing from the spirit and scope of the present invention. Upon determining an Average Repeat Period parameter for each combination of values of the multiple combinations of values, controller may then selects the combination of values based on the Average Repeat Period parameters, such as selecting the combination of values that corresponds to the lowest determined Average Repeat Period.

By determining a combination of values of multiple combinations of values associated with a first control channel parameter and a second control channel parameter that yield a most desirable determination of a first, second, and/or third repeat period, which first, second, and third repeat period are respectively associated with a first, second, and third control message, communication system 100 optimizes the values assigned to the first and second control channel parameters. In a PSI embodiment of the present invention wherein the system operating parameters comprise Packet System Information (PSI) that is broadcast over a PBCCH via PSI messages that include a PSI1 message, a PSI high repetition rate (HR) message, and a PSI low repetition rate (LR) message, communication system 200 may optimize a first control channel parameter that corresponds to a 'PSI1_REPEAT_PERIOD' parameter, that is, that corresponds to a repeat period of the PSI1 message, and a second control channel parameter that corresponds to a 'BS_PBCCH_BLKS' parameter, that is, that corresponds to a number of blocks allocated to the PBCCH.

Communication system 200 determines the optimal values for the first and second control channel parameters by assigning a combination of values of multiple combinations of values to the first control channel parameter and the second control channel parameter. Based on the values assigned to the first and/or second control channel parameters, the repeat periods corresponding to each of the first, second, and third control messages are determined. New combinations of values of the multiple combinations of values are then assigned to the first and second control channel parameters and new repeat periods corresponding to each of the first, second, and third control messages are determined in association with each new combination. Optimal repeat periods corresponding to each of the first, second, and third control messages are then selected from among the repeat periods determined with respect to each combination of values. Based on the selected repeat periods, the optimal combination of values is selected for each of the first and second control channel parameters.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. It is further understood that the use of the term "repetition" is intended to cover a first recitation or conveyance of a message or an instance as well any further recitation or conveyance of the message or the instance. It is additionally understood that the use of relational terms, if any, such as first and second, top and bottom, and the like are used solely to distinguish one entity or action from another entity or action without necessarily requiring or implying any actual such relationship or order between such entities or actions.

What is claimed is:

1. A method for scheduling a control channel comprising:
    (a) assigning a combination of values of a plurality of combinations of values to a first control channel parameter and a second control channel parameter;
    (b) determining a first repeat period associated with a first control message based on the values assigned to each of the first control channel parameter and the second control channel parameter;
    (c) determining a second repeat period associated with a second control message based on the value assigned to the first control channel parameter;
    (d) determining a third repeat period associated with a third control message based on the values assigned to each of the first control channel parameter and the second control channel parameter;
    (e) determining whether there are any combinations of values of the plurality of combinations of values that have not yet been assigned to the first control channel parameter and the second control channel parameter;
    (f) when there is at least one combination of values of the plurality of combinations of values that has not yet been assigned to the first control channel parameter and the second control channel parameter, assigning a not yet assigned combination of values to the first control channel parameter and the second control channel parameter and repeating steps (b) through (e); and
    (g) when steps (b) through (d) have been executed for all combinations of values of the plurality of combinations of values, selecting a combination of values of the plurality of combinations of values based on at least one of the first repeat period, the second repeat period, and the third repeat period determined in association with each combination of values of the plurality of combinations of values.

2. The method of claim 1, wherein the second control message comprises a high repetition rate control message and the third control message comprises a low repetition rate control message.

3. The method of claim 1, wherein the first control channel parameter corresponds to a repeat period of the first control message and the second control channel parameter corresponds to a number of blocks per multiframe allocated to the control channel.

4. The method of claim 1, wherein a control channel repeat period comprises a repeat period of at least one of the first control message and the second control message, wherein the third control message comprises a plurality of instances, and wherein determining a third repeat period comprises:
    (d)(1) determining, based on the values assigned to each of the first and second control channel parameters, a number of control channel repeat periods required to completely fit an integer number of repetitions of the plurality of instances of the third control messages while also utilizing all blocks available in the determined number of control channel repeat periods for allocation to the instances of the third control messages; and
    (d)(2) determining a third repeat period by dividing the determined number of control channel repeat periods by the number of repetitions of the plurality of instances that completely fit into the determined number of control channel repeat periods.

5. The method of claim 4, wherein each control channel repeat period comprises a plurality of multiframes, wherein each multiframe of the plurality of multiframes comprises a plurality of blocks, wherein the control channel comprises one or more blocks of the plurality of blocks in each multiframe, and wherein (d)(1) comprises:

(d)(1)(a) determining a number of control channel repeat periods required to once convey all instances of the third control message, wherein, when the instances of the third control message are not sufficient to fill all control channel blocks available for allocation to the instances of the third control message in a last control channel repeat period of the determined number of control channel repeat periods, the last control channel repeat period is not included in the determined number of control channel repeat periods and the method further comprises:

(d)(1)(b) adding another control channel repeat period to the determined number of control channel repeat periods to produce a re-determined number of control channel repeat periods;

(d)(1)(c) determining whether an integer number of repetitions of the plurality of instances of the third control messages may completely fit into the re-determined number of control channel repeat periods while also utilizing all blocks available in the re-determined number of control channel repeat periods for allocation to the instances of the third control messages; and (d)(1)(d) when an integer number of repetitions of the plurality of instances of the third control messages may not be completely fit into the re-determined number of control channel repeat periods, repeating steps (d)(1)(b) through (d)(1)(d).

6. The method of claim 1, wherein selecting comprises:

determining, in association with each combination of values of the plurality of combinations of values, an average of at least two of the first, second and third repeat periods to produce an average repeat period; and selecting a combination of values based on the average repeat period determined in association with each combination of values of the plurality of combinations of values.

7. The method of claim 1, wherein the first control message comprises a PSI1 (Packet System Information 1) message, the second control message comprises a PSI high repetition rate message, and the third control message comprises a PSI low repetition rate message.

8. The method of claim 7, wherein the first control channel parameter corresponds to a PSI1 repeat period and the second control channel parameter corresponds to a number of blocks of a multiframe allocated to the control channel.

9. The method of claim 7, wherein the control channel comprises a Packet Broadcast Control Channel (PBCCH).

10. A controller capable of scheduling a control channel, the controller comprising:

at least one memory device that stores a plurality of combinations of values; and a processor coupled to the at least one memory device that assigns a combination of values of a plurality of combinations of values to a first control channel parameter and a second control channel parameter, determines a first repeat period associated with a first control message based on the values assigned to each of the first control channel parameter and the second control channel parameter, determines a second repeat period associated with a second control message based on the value assigned to the first control channel parameter, determines a third repeat period associated with a third control message based on the values assigned to each of the first control channel parameter and the second control channel parameter, determines whether there are any combinations of values of the plurality of combinations of values that have not yet been assigned to the first control channel parameter and the second control channel parameter, when there is at least one combination of values of the plurality of combinations of values that has not yet been assigned to the first control channel parameter and the second control channel parameter, assigns a not yet assigned combination of values to the first control channel parameter and the second control channel parameter and determines a new first repeat period, second repeat period, and third repeat period based on the newly assigned combination of values, and, when a first repeat period, second repeat period, and third repeat period has been determined for all combinations of values of the plurality of combinations of values, selects a combination of values of the plurality of combinations of values based on at least one of the first repeat period, the second repeat period, and the third repeat period determined in association with each combination of values of the plurality of combinations of values.

11. The controller of claim 10, wherein the second control message comprises a high repetition rate control message and the third control message comprises a low repetition rate control message.

12. The controller of claim 10, wherein the first control channel parameter corresponds to a repeat period of the first control message and the second control channel parameter corresponds to a number of blocks per multiframe allocated to the control channel.

13. The controller of claim 10, wherein a control channel repeat period comprises a repeat period of at least one of the first control message and the second control message, wherein the third control message comprises a plurality of instances, and wherein the processor determines a third repeat period by determining, based on the values assigned to each of the first and second control channel parameters, a number of control channel repeat periods required to completely fit an integer number of repetitions of the plurality of instances of the third control messages while also utilizing all blocks available in the determined number of control channel repeat periods for allocation to the instances of the third control messages, and determining a third repeat period by dividing the determined number of control channel repeat periods by the number of repetitions of the plurality of instances that completely fit into the determined number of control channel repeat periods.

14. The controller of claim 13, wherein each control channel repeat period comprises a plurality of multiframes, wherein each multiframe of the plurality of multiframes comprises a plurality of blocks, wherein the control channel comprises one or more blocks of the plurality of blocks in each multiframe, and wherein the processor determines a number of control channel repeat periods required to completely fit an integer number of repetitions of the plurality of instances of the third control messages by determining a number of control channel repeat periods required to once convey all instances of the third control message, and wherein, when the instances of the third control message are not sufficient to fill all control channel blocks available for allocation to the instances of the third control message in a last control channel repeat period of the determined number of control channel repeat periods, the last control channel repeat period is not included in the determined number of control channel repeat periods and the processor further adds additional control channel repeat periods to the determined number of control channel repeat periods to produce a re-determined number of control channel repeat periods until an integer number of repetitions of the plurality of instances of the third control messages may completely fit into the re-determined number of control channel repeat periods while also utilizing all blocks available in the re-determined number of control channel repeat periods for allocation to the instances of the third control messages.

15. The controller of claim 10, wherein the processor selects a combination of values by determining, in association with each combination of values of the plurality of combinations of values, an average of at least two of the first, second and third repeat periods to produce an average repeat period and selecting a combination of values based on the average repeat period determined in association with each combination of values of the plurality of combinations of values.

16. The controller of claim 10, wherein the first control message comprises a PSI1 (Packet System Information 1) message, the second control message comprises a PSI high repetition rate message, and the third control message comprises a PSI low repetition rate message.

17. The controller of claim 16, wherein the first control channel parameter corresponds to a PSI1 repeat period and the second control channel parameter corresponds to a number of blocks of a multiframe allocated to the control channel.

18. The controller of claim 17, wherein the control channel comprises a Packet Broadcast Control Channel (PBCCH).

* * * * *